US008472724B2

(12) United States Patent
Lertrattanapanich et al.

(10) Patent No.: US 8,472,724 B2
(45) Date of Patent: Jun. 25, 2013

(54) SYSTEM AND METHOD FOR REDUCING NOISE IN AN IMAGE

(75) Inventors: Surapong Lertrattanapanich, Irvine, CA (US); Yeong-Taeg Kim, Irvine, CA (US)

(73) Assignee: Samsung Electronics Co., Ltd., Suwon, Gyeonggi-Do (KR)

(*) Notice: Subject to any disclaimer, the term of this patent is extended or adjusted under 35 U.S.C. 154(b) by 308 days.

(21) Appl. No.: 12/827,986

(22) Filed: Jun. 30, 2010

(65) Prior Publication Data
US 2012/0002896 A1   Jan. 5, 2012

(51) Int. Cl.
*G06K 9/56* (2006.01)
*G06K 9/40* (2006.01)

(52) U.S. Cl.
USPC .................... 382/205; 382/260; 382/266

(58) Field of Classification Search
USPC ............. 382/199, 165, 167, 260, 261, 264, 382/266, 275; 348/606, 607, 622, 625, 627, 348/666; 375/240.2, 240.24, 240.29
See application file for complete search history.

(56) References Cited

U.S. PATENT DOCUMENTS

| 6,633,683 | B1* | 10/2003 | Dinh et al. | 382/260 |
| 6,731,806 | B1* | 5/2004 | Gindele | 382/205 |
| 6,856,704 | B1* | 2/2005 | Gallagher et al. | 382/263 |
| 6,907,144 | B1* | 6/2005 | Gindele | 382/275 |
| 6,937,772 | B2* | 8/2005 | Gindele | 382/240 |
| 7,657,098 | B2* | 2/2010 | Lin et al. | 382/199 |
| 2004/0062437 | A1* | 4/2004 | Luo et al. | 382/166 |
| 2005/0089247 | A1* | 4/2005 | Braun et al. | 382/298 |
| 2005/0281458 | A1* | 12/2005 | Adams et al. | 382/162 |
| 2008/0002902 | A1* | 1/2008 | Lin et al. | 382/261 |
| 2009/0097775 | A1* | 4/2009 | Monobe et al. | 382/268 |

OTHER PUBLICATIONS

Ramponi et al., "Nonlinear Unsharp Masking Methods for Image Contrast Enhancement," Journal of Electronic Imaging 5(3), pp. 353-366 (Jul. 1996).*

* cited by examiner

*Primary Examiner* — Andrae S Allison

(57) ABSTRACT

A system and method of reducing noise are disclosed. In one embodiment a system comprises an input configured to receive an input image, a filter configured to filter the input image to generate a filtered image, a weight generator configured to generate one or more edge weights related to at least one edge of the input image, a mixer configured to generate an output image based on the input image, the filtered image, and at least one of the edge weights, and an output configured to output the output image.

27 Claims, 6 Drawing Sheets

SYSTEM AND METHOD FOR REDUCING NOISE IN AN IMAGE

BACKGROUND

1. Field

This application relates to image processing, and in particular, to reducing noise in an image.

2. Description of the Related Technology

Image and video compression technology function to reduce the amount of storage space as well as the transmission bandwidth of digital image and video content. However, when the compression rate is high, the resulting encoded content can suffer from compression artifacts, such as block artifacts and mosquito noise. Mosquito noise usually appears near the strong edge of objects in the decoded image or video.

The effect of mosquito noise becomes even more noticeable when the decompressed image or video is shown on a larger display or is further passed through a detail enhancement filter that may be used in digital televisions. Some mosquito noise reduction algorithms rely on the availability of the decoded compression information. However, such information is not always available as the video content could be decoded through an external device, such as DVD player, Blu-ray disc player, or cable/satellite set-top-box, and the compression information may not be sent to a display device, such as a television.

Accordingly, a system and method for reducing mosquito noise without compression information is desirable. Such a system and method could also be used when compression information is available in order to reduce computational complexity.

SUMMARY OF CERTAIN INVENTIVE ASPECTS

The systems and methods of the development each have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description of Certain Inventive Embodiments" one will understand how the sample features of this development provide advantages that include reducing mosquito noise in a decompressed image.

One aspect is a method of processing an image, the method comprising receiving an input image, filtering the input image to generate a filtered image, generating one or more edge weights related to at least one edge of the input image, generating an output image based on the input image, the filtered image, and at least one of the edge weights, and outputting the output image.

Another aspect is a system for processing an image, the system comprising a input configured to receive an input image, a filter configured to filter the input image to generate a filtered image, a weight generator configured to generate one or more edge weights related to at least one edge of the input image, a mixer configured to generate an output image based on the input image, the filtered image, and at least one of the edge weights, and an output configured to output the output image.

Another aspect is a system for processing an image, the system comprising means for receiving an input image, means for filtering the input image to generate a filtered image, means for generating one or more edge weights related to at least one edge of the input image, means for generating an output image based on the input image, the filtered image, and at least one of the edge weights, and means for outputting the output image.

Another aspect is a computer-readable storage medium having processor-executable instructions encoded thereon which, when executed by a processor, cause a computer to perform a method of image processing, the method comprising receiving an input image, filtering the input image to generate a filtered image, generating one or more edge weights related to at least one edge of the input image, generating an output image based on the input image, the filtered image, and at least one of the edge weights, and outputting the output image.

DETAILED DESCRIPTION OF CERTAIN INVENTIVE EMBODIMENTS

The following detailed description is directed to certain specific aspects of the development. However, the development can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may be performed by one or more computer processors configured to execute instructions retrieved from a computer-readable storage medium. A computer-readable storage medium stores information, such as data or instructions, for some interval of time, such that the information can be read by a computer during that interval of time. Examples of computer-readable storage media are memory, such as random access memory (RAM), and storage, such as hard drives, optical discs, flash memory, floppy disks, magnetic tape, paper tape, punch cards, and Zip drives.

Figure 1A:
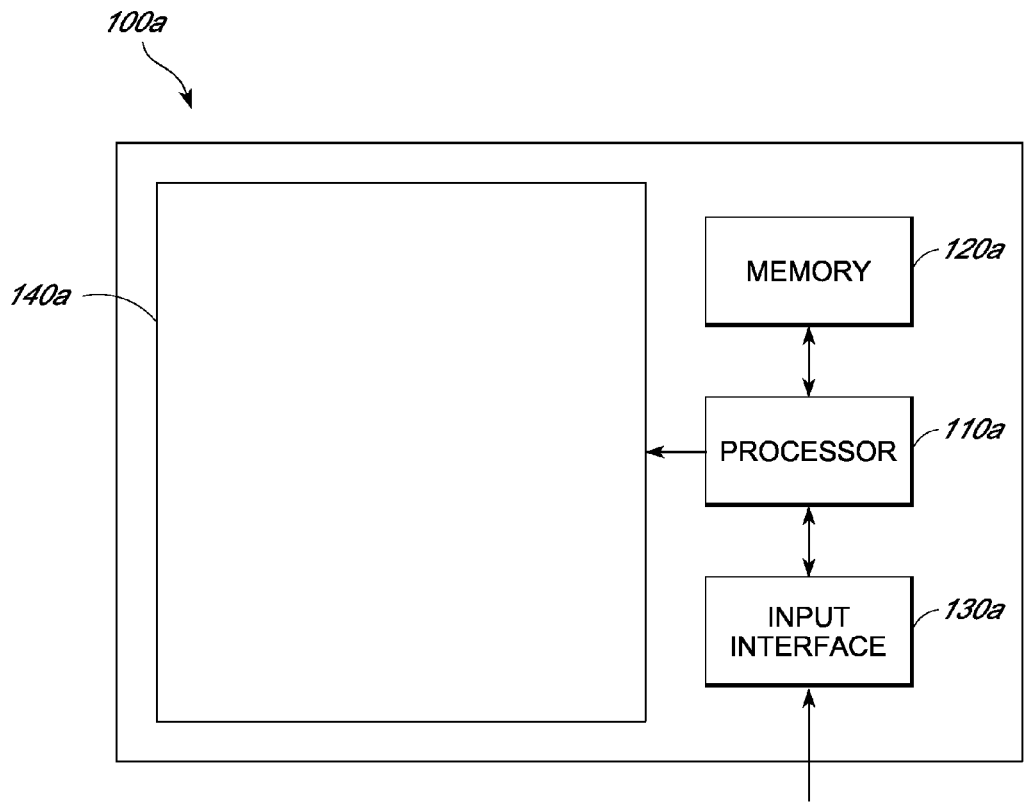
FIG. 1A is a functional block diagram of a display device.

FIG. 1A is a functional block diagram of a display device 100a. The display device 100a includes a processor 110a in data communication with a memory 120a, an input interface 130a and a display 140a.

The processor 110a can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 110a can be coupled, via one or more buses, to read information from or write information to memory 120a. The processor may additionally, or in the alternative, contain memory, such as processor registers. The memory 120a can include processor cache, including a multi-level hierarchical cache in which different levels have different capacities and access speeds. The memory 120a can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110a is also coupled to an input interface 130a and a display 140a. The input interface 130a receives image data and provides the image data to the processor 110a. The input interface 130a can receive image data from an external source (e.g., a DVD player, a Blu-ray player, or a set-top box) or from another portion of the display device 100a, such as an image processor or image decompression unit. The display 140a receives image data from the processor 110a and displays it to a viewer.

In one embodiment, the display device 100a is a television. In another embodiment, the display device is a consumer electronic device, such as a gaming console, mobile telephone, a personal data assistant (PDAs), or a computer (e.g., a hand-held computer, a laptop computer, or a desktop computer).

Figure 1B:
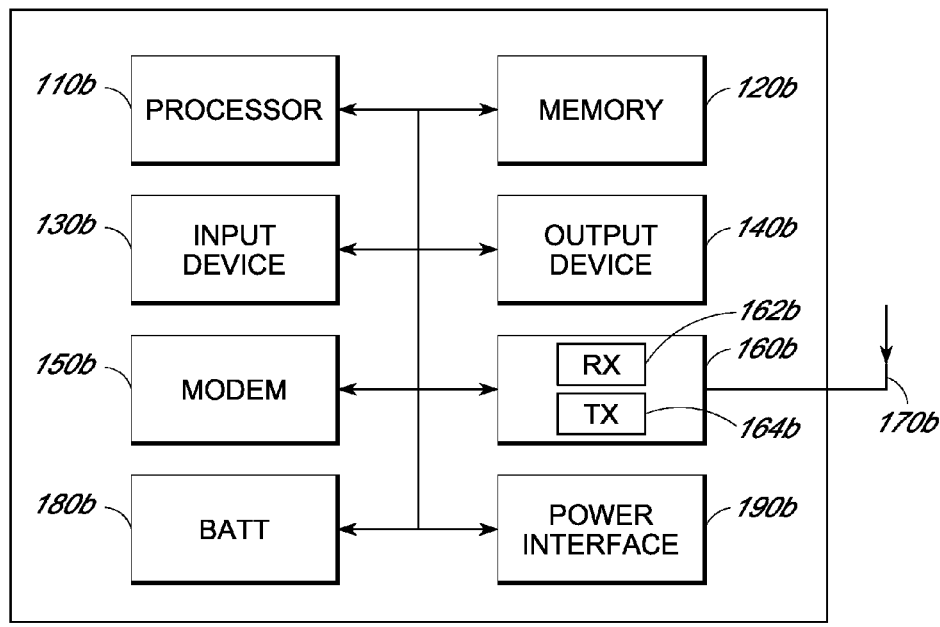
FIG. 1B is a functional block diagram of a consumer electronic device.

FIG. 1B is a functional block diagram of a consumer electronic device 100. The consumer electronic device 100b includes a processor 110b in data communication with a memory 120b, an input device 130b, and an output device 140b. The processor is further in data communication with a modem 150b and a transceiver 160b. The transceiver 160b is also in data communication with the modem 150b and an antenna 170b. The consumer electronic device 100b and components thereof are powered by a battery 180b and/or an external power source. In some embodiments, the battery 180b, or a portion thereof, is rechargeable by an external power source via a power interface 190b. Although described separately, it is to be appreciated that functional blocks described with respect to the consumer electronic device 100b need not be separate structural elements. For example, the processor 110b and memory 120b may be embodied in a single chip. Similarly, two or more of the processor 110b, modem 150b, and transceiver 160b may be embodied in a single chip. Additionally, the input device 130b and output device 140b may be a single structure, such as a touch screen display.

The processor 110b can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 110b can be coupled, via one or more buses, to read information from or write information to a memory 110b. The processor may additionally, or in the alternative, contain memory, such as processor registers. The memory 110b can include a processor cache, including a multi-level hierarchical cache in which different levels have different capacities and access speeds. The memory 110b can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110b is also coupled to an input device 130b and an output device 140b for, respectively, receiving input from and providing output to, a user of the consumer electronic device 100b. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, a microphone (possibly coupled to audio processing software to, e.g., detect voice commands), or an accelerometer. Suitable output devices include, but are not limited to, visual output devices, including displays and printers, audio output devices, including speakers, headphones, earphones, and alarms, and haptic output devices, including force-feedback game controllers and vibrating devices.

The processor 110b is further coupled to a modem 150b and a transceiver 160b. The modem 150b and transceiver 160b prepare data generated by the processor 110b for wireless transmission via the antenna 170b according to one or more air interface standards. The modem 150b and transceiver 160b also demodulate data received via the antenna 170b according to one or more air interface standards. The transceiver can include a transmitter 162b, a receiver 164b, or both. In other embodiments, the transmitter and receiver are two separate components. The modem 150b and transceiver 160b, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

The consumer electronic device 100b and components thereof are powered by a battery 180b and/or an external power source. The battery 180b can be any device that stores energy, and particularly any device which stores chemical energy and provides it as electrical energy. The battery 180b can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some embodiments, the battery 180b, or a portion thereof, is rechargeable by an external power source via a power interface 190b. The power interface 190b can include a jack for connecting a battery charger, an inductor for near field wireless energy transfer, or a photovoltaic panel for converting solar energy into electrical energy.

Figures 2, 3:
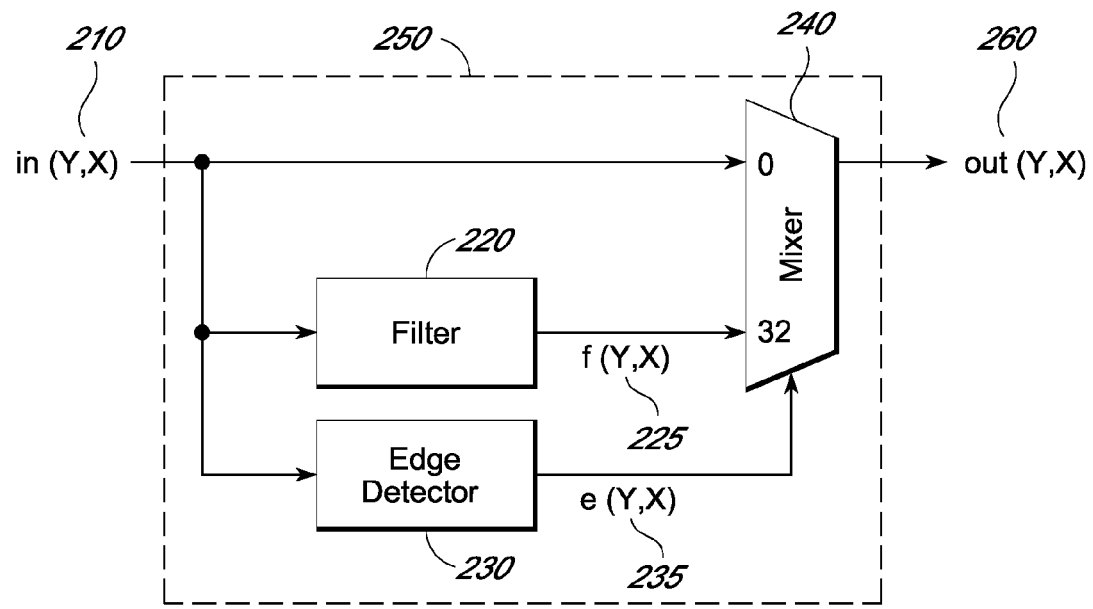
FIG. 2 is a functional block diagram of a noise reduction module that can reduce mosquito noise without compression information.
FIG. 3 is a matrix of preset weights, $p_k$, associated with various neighboring pixel locations, k, according to one embodiment.

As discussed above, decompressed images can suffer from mosquito noise, typically near edges of objects in the decoded image. FIG. 2 is a functional block diagram of a noise reduction module 250 that can reduce mosquito noise without compression information. The noise reduction module 250 receives input image data 210 and produces output image data 260. The input image data 210 is input into a filter 220, an edge detector 230, and a mixer 240.

In one embodiment, the input image data 210 is the luminance component of a decoded image. In one embodiment, the input image data 210 is a set of input values respectively associated with a plurality of pixel locations. In one embodiment, the pixel locations correspond to a two-dimensional image map.

The filter 220 receives the input image data 210 and produces filtered image data 225. In one embodiment, the filtered image data 225 is a set of filtered values respectively associated with a plurality of pixel locations. In one embodiment, the filter 220 is a low-pass filter.

In one embodiment, the filter 220 is a sigma filter. One advantage of a sigma filter as compared to other filters is that it effectively reduces the noise while preserving the geometric structure (such as edges) of objects within the image. However, the sigma filter could also introduce a blurring effect if it is directly applied on a high detail area (such as texture) of the image. To prevent this shortcoming, the edge detector 230, described more fully below, is used in conjunction with the filter 220.

The sigma filter can be based on a weighted average operation. In one embodiment, the filtered value at a particular pixel location, designated (y,x), is given by the following equation:

$$f(y,x) = \frac{\sum_k p_k w_k |in(y,x) - S_k|}{\sum_k p_k w_k}, \quad (1)$$

wherein in(y,x) is the input value at the particular pixel location, f(y,x) is the filtered value at the particular pixel location, k is an index of neighboring pixel locations defining a window about the particular pixel location, $S_k$ is the input value at the neighboring pixel location k, $p_k$ is a preset weight associated with the neighboring pixel location, and $w_k$ is a dynamic weight associated with the neighboring pixel location.

In one embodiment, k ranges from 1 to $N^2$ and designates the pixel locations within N−1 pixels of the particular pixel location. For example, if k ranges from 1 to 25, k=1 indicates the pixel location (y−2,x−2), k=2 indicates the pixel location (y−2,x−1), k=3 indicates the pixel location (y−2,x), k=6 indicates the pixel location (y−1,x−2), etc. Thus, $S_1$ is the input value at pixel location (y−2,x−2), $S_2$ is the input value at the pixel location (y−2,x−1), etc.

FIG. 3 is a matrix of preset weights, $p_k$, associated with various neighboring pixel locations, k, according to one embodiment. In the illustrated embodiment, k ranges from 1 to 49 and designates the pixel locations within 3 pixels of a particular pixel location. Thus, $p_1$ is 0, $p_2$ is 0, $p_3$ is 0, $p_4$ is 1, $p_8$ is 0, $p_{15}$ is 0, $p_{22}$ is 4, etc. The preset weights can be geometrically adjusted to different shapes. In FIG. 3, a diamond shape is presented. By changing the preset weights, certain subsampling structures can be generated.

In one embodiment, the dynamic weights, $w_k$, are based on the difference between the input value at a particular location and the input value at a neighboring pixel location. This difference is referred to herein as the pixel difference. Thus, in one embodiment, $w_k$ is a function of in(y,x)−$S_k$. In a particular embodiment, $w_k$ is a function of the absolute value of in(y,x)−$S_k$.

Figure 4:
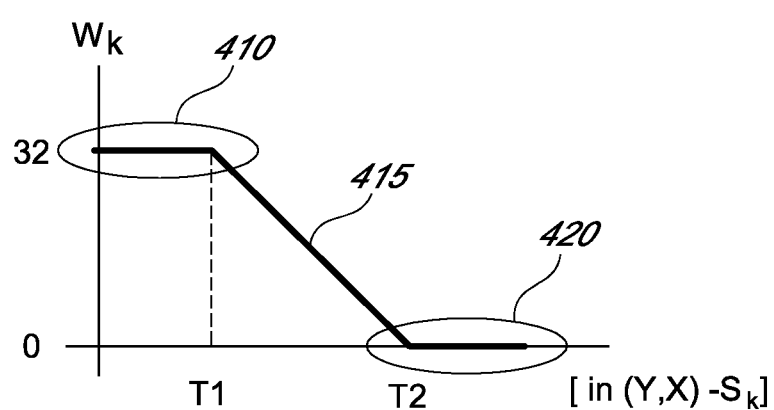
FIG. 4 is a graph of dynamic weight for a neighboring position versus the absolute value of the pixel difference.

FIG. 4 is a graph of dynamic weight for a neighboring position, with respect to a specified position, versus the absolute value of the pixel difference between the positions. In particular, FIG. 4 illustrates a ramp function having a first constant value 410 between 0 and $T_1$ and a second constant value 420 above $T_2$. Between $T_1$ and $T_2$, the dynamic weight is linearly proportional to the absolute value of the pixel difference. In one embodiment, the first constant value 410 is 32 and the second constant value is 0. In one embodiment, particularly useful for an 8-bit luminance image, $T_1$ is 0 and $T_2$ is 12.

In certain embodiment, including the embodiment illustrated in FIG. 4, the dynamic weight is a monotonically decreasing function of the absolute value of the pixel difference. Accordingly, the smaller the difference between the input value at the particular location and the input value at the neighboring pixel location, the larger the dynamic weight. Similarly, if pixel difference is large, the dynamic weight will be small.

Although a ramp-like function is illustrated in FIG. 4, the dynamic weight can be determined using other functions of the absolute value of the pixel difference. In another embodiment, the dynamic weight is an exponential function of the absolute value of the pixel difference. Mathematically, the dynamic weight can be determined based on the following equation, where $C_1$, $C_2$, $C_3$, and $C_4$ are constants:

$$w_k = C_1 e^{-\frac{|in(y,x)-S_k|-C_2}{C_3}} + C_4. \quad (3)$$

In one embodiment, the dynamic weight is a half-normal function of the absolute value of the pixel difference. Mathematically, the dynamic weight can be determined based on the following equation, where $C_1$, $C_2$, $C_3$, and $C_4$ are constants:

$$w_k = C_1 e^{-\frac{(|in(y,x)-S_k|-C_2)^2}{C_3}} + C_4. \quad (4)$$

As mentioned above, mosquito noise typically appears more prevalently near the edge of an object in a decompressed image. Particularly, there is more mosquito noise near the edge of object than there is at the edge of the object or in a textured or detailed portion of the image. As described above with respect to FIG. 2, the input image data 210 is input into an edge detector 230. The edge detector 230 receives the input image data 210 and produces edge weights 235. In one embodiment, the input image data 210 is a set of input values respectively associated with a plurality of pixel locations and the edge weight 235 are a set of edge weights respectively associated with the plurality of pixel locations.

In one embodiment, the edge weights range from a lowest edge weight value indicating that the pixel location is not near an edge and a highest edge weight value indicating that the pixel location is near an edge. In one embodiment, the lowest edge weight value is 0 and the highest edge weight value is 32.

In one embodiment, the edge detector 230 determines the edge weights based on the variance of the input values associated with pixel locations within a small window and the variance of the input values associated with pixel locations within a large window. In one embodiment, the size of the small window is 3×3 and the size of the large window is 15×15.

The variance of the input values associated with pixel locations within the small window can be determined according to the equation below:

$$\sigma_s = \frac{\sum_i \left| A_i - \frac{\sum_i A_i}{N_S} \right|}{N_S}, \quad (5)$$

where $\sigma_S$ is the variance of the input values associated with pixel locations within the small window, i is an index of neighboring pixel locations within the small window, $A_i$ is the input value associated with pixel location i, and $N_S$ is the number of pixels within the small window. Similarly, the variance of the input values associated with pixel locations within the large window can be determined according to the equation below:

$$\sigma_L = \frac{\sum_j \left| A_j - \frac{\sum_j A_j}{N_L} \right|}{N_L}, \quad (6)$$

where $\sigma_L$ is the variance of the input values associated with pixel locations within the large window, j is an index of neighboring pixel locations within the large window, $A_j$ is the input value associated with pixel location j, and $N_L$ is the number of pixels within the large window.

By determining the variances of the input values associated with pixel locations within the small and large windows, each pixel can be classified into one of four classes as follows. If the variance based on the small window and the variance based on the large window are both low, the pixel is within a smooth region of the image. If the variance based on the small window is low and the variance based on the large window is high, the pixel is near an edge of an object within the image. If the variance based on the small window is high and the variance based on the large window is low, the pixel is within a smooth region of the image. If the variance based on the small window and the variance based on the large window are both high, the pixel is at an edge of an object within the image.

In one embodiment, the edge detector 230 outputs a larger edge weight when the pixel location is near an edge, that is when $\sigma_S$ is low and when $\sigma_L$ is high. In one embodiment, the edge weight is determined according to the following equation:

$$e(y,x) = C_1 * w_s * w_l + C_2, \quad (6)$$

wherein e(y,x) is the edge weight value associated with a particular pixel location (y,x), $w_S$ is a small window sigma weight based on $\sigma_S$, $w_L$ is a large window sigma weight based on $\sigma_L$, and $C_1$ and $C_2$ are constants. In one embodiment, $C_1$ is 1/32 and $C_2$ is 0.

Figure 5B:
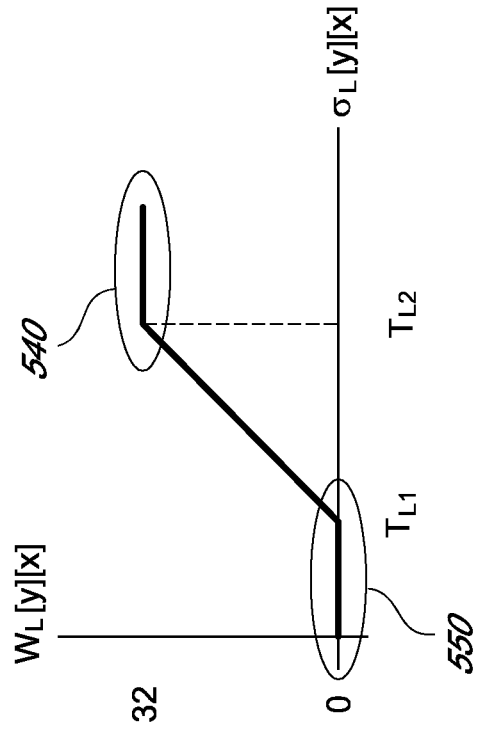
FIG. 5B is a graph of large window sigma weight versus the variance of the input values within a large window.
Figure 5A:
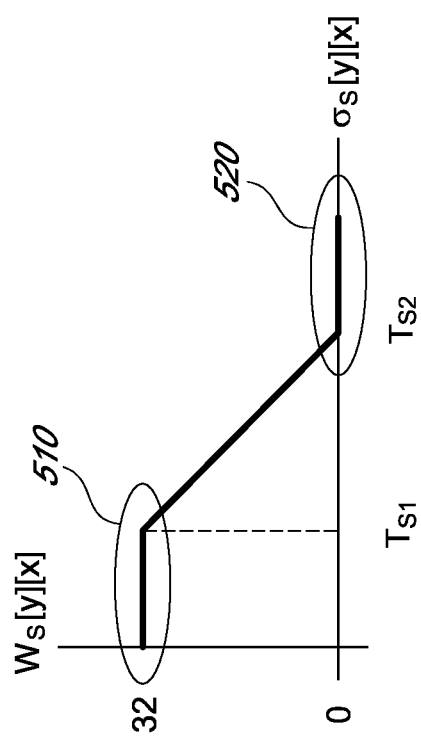
FIG. 5A is a graph of small window sigma weight versus the variance of the input values within a small window.

The small window sigma weight and large window sigma weight are based on $\sigma_S$ and $\sigma_L$, respectively. As mentioned above, in one embodiment, the edge weight is higher in regions of the image for which $\sigma_S$ is low and for which $\sigma_L$ is high. FIG. 5A is a graph of small window sigma weight versus the variance of the input values within a small window. FIG. 5B is a graph of large window sigma weight versus the variance of the input values within a large window.

FIG. 5A shows a ramp function having a first constant value 510 between 0 and $T_{S1}$ and a second constant value 520 above $T_{S2}$. Between $T_{S1}$ and $T_{S2}$, the small window sigma weight is linearly proportional to $\sigma_S$. In one embodiment, the first constant value 510 is 32 and the second constant value is 0. In one embodiment, particularly useful for an 8-bit luminance image, $T_{S1}$ is 20 and $T_{S2}$ is 28.

In certain embodiments, including the embodiment illustrated in FIG. 5A, the small window sigma weight is a monotonically decreasing function of $\sigma_S$. Accordingly, the smaller the variance of the input values of pixel locations within the small window, the larger the small window sigma weight. Similarly, if the variance is large, the small window sigma weight will be small.

Although a ramp-like function is illustrated in FIG. 5A, the small window sigma weight can be determined using other functions of $\sigma_S$. In another embodiment, the small window sigma weight is an exponential function of $\sigma_S$. Mathematically, the small window sigma weight can be determined based on the following equation, where $C_1, C_2, C_3$, and $C_4$ are constants:

$$w_S = C_1 e^{-\frac{\sigma_S - C_2}{C_3}} + C_4. \quad (7)$$

In one embodiment, the small window weight is a half-normal function of $\sigma_S$. Mathematically, the small window sigma weight can be determined based on the following equation, where $C_1, C_2, C_3$, and $C_4$ are constants:

$$w_S = C_1 e^{-\frac{(\sigma_S - C_2)^2}{C_3}} + C_4. \quad (8)$$

FIG. 5B shows a ramp function having a first constant value 530 between 0 and $T_{L1}$ and a second constant value 540 above $T_{L2}$. Between $T_{L1}$ and $T_{L2}$, the large window sigma weight is linearly proportional to $\sigma_L$. In one embodiment, the first constant value 530 is 0 and the second constant value is 32. In one embodiment, particularly useful for an 8-bit luminance image, $T_{L1}$ is 4 and $T_{L2}$ is 8.

In certain embodiments, including the embodiment illustrated in FIG. 5B, the large window sigma weight is a monotonically increasing function of $\sigma_L$. Accordingly, the larger the variance of the input values of pixel locations within the large window, the larger the large window sigma weight. Similarly, if the variance is small, the large window sigma weight will be small. Although a ramp-like function is illustrated in FIG. 5B, the large window sigma weight can be determined using other functions of $\sigma_L$.

Figure 6:
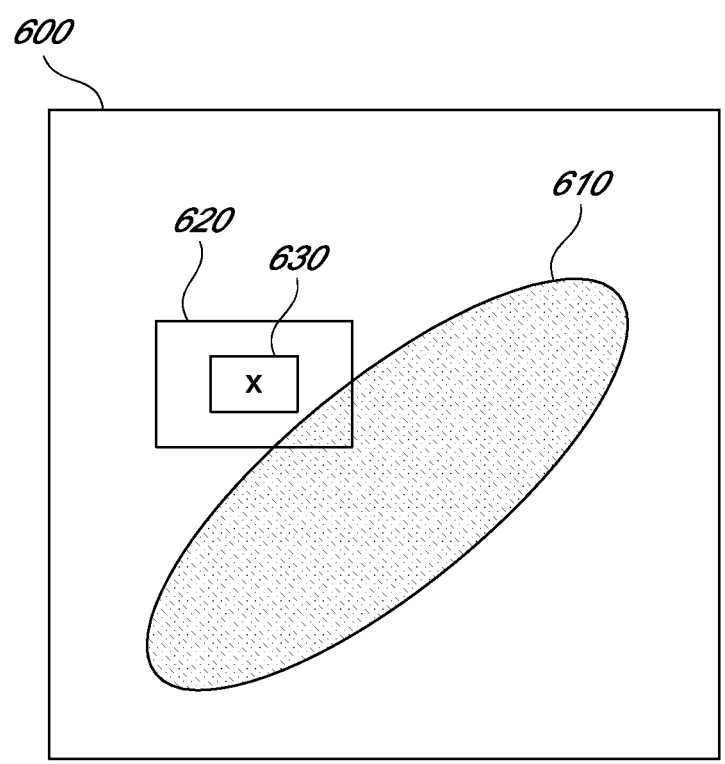
FIG. 6 illustrates a small window and a large window about a pixel x near the edge of an object within an image.

The function of the edge detector 230 is described by way of example with respect to FIG. 6. FIG. 6 illustrates a small window 630 and a large window 620 about a pixel x near the edge of an object 610 within an image 600. Because all of the input values associated with pixels within the small window 630 are equal, the variance of the input values associated with pixels within the small window 630 will be low. Because the input values associated with pixels within the large window 620 differ, due to the fact that the window encompasses portions of image 600 in which the object 610 appears and portions of the image 600 in which the object 610 does not appear, the variance of the input values associated with pixels within the large window 620 will be high.

Because $\sigma_S$ is low, the small window sigma weight will be high. Because $\sigma_L$ is high, the large window sigma weight will also be high. The product of the sigma weights will also be high, indicating that the pixel x is located near the edge of the object 610.

Referring again to FIG. 2, the mixer 240 receives the input image data 210, the filtered image data 225, and the edge weights 235. The mixer outputs output image data 260 based on the input image data 210, the filtered image data 225, and the edge weights 235. In one embodiment, the mixer 240 linearly mixes the input image data 210 and the filtered image data 225 as weighted by the edge weights 235. Thus, in one embodiment, the output image data 260 can be determined according to the following equation:

$$out(y,x) = \alpha * in(y,x) + \beta * f(y,x) \qquad (9)$$

wherein out(y,x) is the output value associated with a particular pixel location (y,x), and $\alpha$ and $\beta$ are based on the edge weight, e(y,x). In one embodiment, the edge weights range from 0 to 32, $\beta$ is e(y,x)/32, and $\alpha$ is 1-$\beta$.

Where $\alpha$ is 1-$\beta$, and E is the largest edge weight value, Equation 9 can be rewritten as:

$$out(y,x) = in(y,x) + e(y,x) * (f(y,x) - in(y,x))/E \qquad (10)$$

Thus, the output image data 260 can have reduced mosquito noise as compared to the input image data 210. The output image data 260 can be displayed to a view on the display 140 of FIG. 1A. It is to be appreciated that the noise reduction module 230, the filter 220, the edge detector 230, and the mixer 240 can be implemented using the processor 110 of FIG. 1A or as separate components.

Figure 7:
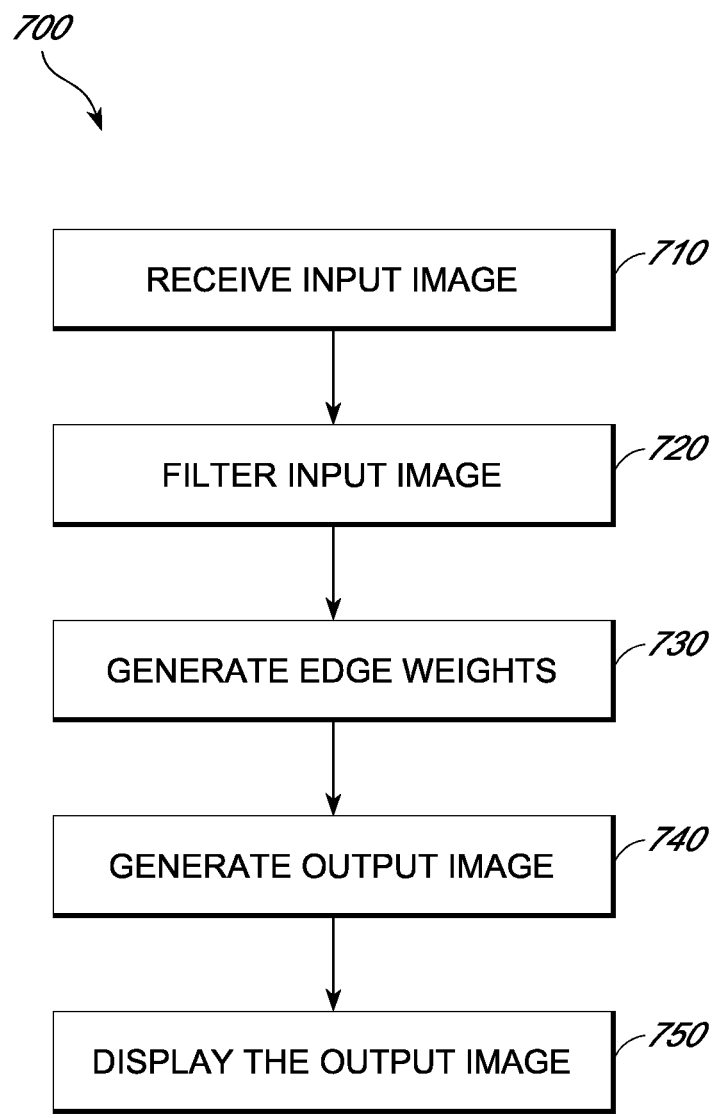
FIG. 7 is a flowchart illustrating a method of reducing noise.

FIG. 7 is a flowchart illustrating a method of reducing noise. The method 700 begins in block 720 with the reception of an input image. The reception can be performed, for example, by the input interface 130a of FIG. 1A or transceiver 160b of FIG. 1B. In one embodiment, the input image is received as a plurality of input values respectively associated with a plurality of pixel locations.

Next, in block 720, the input image is filtered. The filtering can be performed, for example, by the processor 110a of FIG. 1A or the processor 110b of FIG. 1B. In one embodiment, the input image is filtered according to a sigma filtering algorithm. Thus, in one embodiment, the input image is sigma filtered. In one embodiment, filtering the image comprises generating a filtered value for each of a plurality of pixel locations.

The method 700 continues in block 730, where one or more edge weights are generated. The edge weights can be generated, for example, by the processor 110a of FIG. 1A or the processor 110b of FIG. 1B. In one embodiment, generating edge weights comprises generating an edge weight for each of a plurality of pixel locations.

Next, in block 740, an output image is generated. The output image can be generated, for example, by the processor 110a of FIG. 1A or the processor of FIG. 1B. In one embodiment, the output image is generated based on the input image, the filtered image, and at least one of the edge weights. In one embodiment, generating an output image comprises generating a plurality of output values respectively associated with a plurality of pixel locations. In particular, in one embodiment, generating an output image comprises generating a plurality of output values respectively associated with a plurality of pixel locations, wherein each of the output values is based on an input value associated with the pixel location, a filtered value associated with the pixel location, and an edge weight associated with the pixel location.

In block 750, the output image is output. The output image can be output, for example, by the display 140a of FIG. 1A or the transceiver 160b of FIG. 1B. In one embodiment, the output image is displayed. In another embodiment, the output image is transmitted. In one embodiment, outputting the image comprises outputting a plurality of output values respectively associated with a plurality of pixel locations.

While the specification describes particular examples of the present invention, those of ordinary skill can devise variations of the present invention without departing from the inventive concept. Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The terms signal and threshold can depend upon the signal modulation technique. If Pulse Amplitude Modulation (PAM) is used then the voltage amplitude or power of the signal represents its value. In that case the threshold is simply a power value. If Phase Shift Keying is used, then the phase of the signal, which can translate to the sign of the received signal voltage can represent the signal value. In this case if the signal is integrated over multiple symbols, then the sign and amplitude of the received signal together indicate the signal value.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described herein, including but not limited to those performed by the sigma filter 220, edge detector 230, and mixer 240 of FIG. 2, can be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of processing an image, the method comprising:

receiving an input image;

filtering the input image to generate a filtered image including determining a filtered value for each of the plurality of pixel locations by:

determining, for each of the plurality of pixel locations within a defined window about the particular pixel location, a difference between the input value associated with the particular location and the input value associated with the pixel locations within the defined window determining, for each of the plurality of pixel locations within the defined window, a filter weight based on the difference between the input value associated with the particular pixel location and the input value associated with the pixel location within the defined window includes the filter weight based on a first difference greater than the filter weight based on a second difference where the first difference is less than the second difference, determining, for each of the filter weights, a modified filter weight based on the filter weight and a preset window weight, and determining the filtered value based on the differences and the modified filter weights;

generating one or more edge weights related to at least one edge of the input image;

generating an output image based on the input image, the filtered image, and at least one of the edge weights; and outputting the output image.

2. The method of claim 1, wherein filtering the input image comprises sigma filtering the input image.

3. The method of claim 1, wherein generating an output image comprises mixing the input image and the filtered image based on the edge weights.

4. The method of claim 1, wherein:

receiving the input image comprises receiving a plurality of input values respectively associated with a plurality of pixel locations;

generating one or more edge weights comprises determining, for each of the plurality of pixel locations, an edge weight;

generating the output image comprises determining, for each of the plurality of pixel locations, an output value based on the input value associated with the pixel location, the filtered value determined for the pixel location, and the edge weight determined for the pixel location; and outputting the output image comprises outputting the plurality of output values determined for each of the plurality of pixel locations respectively associated with the plurality of pixel locations.

5. The method of claim 4, wherein determining the edge weight for a particular pixel location comprises:

determining a first sigma weight based on a variation of the input values associated with a plurality of pixel locations within a defined first window about the particular pixel location;

determining a second sigma weight based on a variation of the input values associated with a plurality of pixel locations within a defined second window about the particular pixel location, wherein the second window is larger than the first window; and determining the edge weight based on the first sigma weight and the second sigma weight.

6. The method of claim 5, wherein the first sigma weight is determined such that, where a first variation is less than a second variation, a first sigma weight based on the first variation is greater than a first sigma weight based on the second variation.

7. The method of claim 5, wherein the second sigma weight is determined such that, where a first variation is less than a second variation, a second sigma weight based on the first variation is less than a second sigma weight based on the second variation.

8. The method of claim 5, wherein determining the edge weight comprises determining the edge weight based on the product of the first sigma weight and the second sigma weight.

9. The method of claim 4, wherein determining the output value for a particular pixel location comprises:

adding the input value associated with the particular pixel location and the filtered value determined for the particular pixel location, wherein at least one of the input value associated with the particular pixel location and the filtered value determined for the particular pixel location is weighted by the edge weight determined for the particular pixel location.

10. The method of claim 1, wherein the preset window weights for pixel locations within the defined window and closer to the particular pixel location are greater than preset window weights for pixel locations within the defined window and further from the particular pixel location.

11. The method of claim 1, wherein determining the filtered values comprises determining the filtered values based on the ratio of a sum of the differences weighted by the modified filter weights and a sum of the modified filter weights.

12. A system for processing an image, the system comprising:
a processor coupled to a memory;
a input configured to receive an input image;
a filter configured to:
   determine a filtered value for each of a plurality of pixel locations,
   determine, for a particular pixel location for each of the plurality of pixel locations within a defined window about the particular pixel location, a difference between an input value associated with the particular location and the input value associated with the pixel locations within the defined window,
   determine, for each of the plurality of pixel locations within the defined window, a filter weight based on the difference between the input value associated with the particular pixel location and the input value associated with the pixel location within the defined window includes the filter weight based on a first difference greater than the filter weight based on a second difference where the first difference is less than the second difference,
   determine, for each of the filter weights, a modified filter weight based on the filter weight and a preset window weight,
   determine the filtered value based on the differences and the modified filter weights, and
   generate a filtered image from the input image;
a weight generator configured to generate one or more edge weights related to at least one edge of the input image;
a mixer configured to generate an output image based on the input image, the filtered image, and at least one of the edge weights; and
an output configured to output the output image.

13. The system of claim 12, wherein the filter comprises a sigma filter.

14. The system of claim 12, wherein the mixer is configured to mix the input image and the filtered image based on the edge weights.

15. The system of claim 12, wherein:
the input is configured to receive a plurality of input values respectively associated with a plurality of pixel locations;
the weight generator is configured to determine, for each of the plurality of pixel locations, an edge weight;
the mixer is configured to determine, for each of the plurality of pixel locations, a output value based on the input value associated with the pixel location, the filtered value determined for the pixel location, and the weighting value determined for the pixel location; and
the output is configured to output the plurality of output values determined for each of the plurality of pixel locations respectively associated with the plurality of pixel locations.

16. The system of claim 15, wherein the weight generator is configured to, for a particular pixel location:
determine a first sigma weight based on a variation of the input values associated with a plurality of pixel locations within a defined first window about the particular pixel location;
determine a second sigma weight based on a variation of the input values associated with a plurality of pixel locations within a defined second window about the particular pixel location, wherein the second window is larger than the first window; and
determine the edge weight based on the first sigma weight and the second sigma weight.

17. The system of claim 16, wherein the weight generator is configured to determine the first sigma weight such that, where a first variation is less than a second variation, a first sigma weight based on the first variation is greater than a first sigma weight based on the second variation.

18. The system of claim 16, wherein the weight generator is configured to determine the second sigma weight such that, where a first variation is less than a second variation, a second sigma weight based on the first variation is less than a second sigma weight based on the second variation.

19. The system of claim 16, wherein the weight generator is configured to determine the edge weight based on the product of the first sigma weight and the second sigma weight.

20. The system of claim 15, wherein the mixer is configured to, for a particular pixel location:
add the input value associated with the particular pixel location and the filtered value determined for the particular pixel location, wherein at least one of the input value associated with the particular pixel location and the filtered value determined for the particular pixel location is weighted by the edge weight determined for the particular pixel location.

21. The system of claim 12, wherein the preset window weights for pixel locations within the defined window and closer to the particular pixel location are greater than preset window weights for pixel locations within the defined window and further from the particular pixel location.

22. The system of claim 12, wherein the filter is configured to determine the filtered values based on the ratio of a sum of the differences weighted by the modified filter weights and a sum of the modified filter weights.

23. A system for processing an image, the system comprising:
means for receiving an input image;
means for filtering configured to:
   determine a filtered value for each of a plurality of pixel locations,
   determine, for a particular pixel location for each of the plurality of pixel locations within a defined window about the particular pixel location, a difference between an input value associated with the particular location and the input value associated with the pixel locations within the defined window,
   determine, for each of the plurality of pixel locations within the defined window, a filter weight based on the difference between the input value associated with the particular pixel location and the input value associated with the pixel location within the defined window includes the filter weight based on a first difference greater than a filter weight based on a second difference where the first difference is less than the second difference, determine, for each of the filter weights, a modified filter weight based on the filter weight and a preset window weight, determine the filtered value based on the differences and the modified filter weights, and generate a filtered image from the input image;

means for generating one or more edge weights related to at least one edge of the input image;

means for generating an output image based on the input image, the filtered image, and at least one of the edge weights; and means for outputting the output image.

24. The system of claim 23, wherein:

the means for receiving the input image comprises means for receiving a plurality of input values respectively associated with a plurality of pixel locations;

the means for generating one or more edge weights comprises means for determining, for each of the plurality of pixel locations, an edge weight;

the means for generating an output image comprises means for determining, for each of the plurality of pixel locations, an output value based on the input value associated with the pixel location, the filtered value determined for the pixel location, and the edge weight determined for the pixel location; and the means for outputting the output image comprises means for outputting the plurality of output values determined for each of the plurality of pixel locations respectively associated with the plurality of pixel locations.

25. The system of claim 23, wherein at least one of the means for receiving, means for filtering, means for generating one or more edge weights, means for generating an output image, and means for outputting comprises a processor.

26. A non-transitory computer-readable storage medium having processor-executable instructions encoded thereon which, when executed by a processor, cause a computer to perform a method of image processing, the method comprising:

receiving an input image;

filtering the input image to generate a filtered image including determining a filtered value for each of the plurality of pixel locations by:

determining, for each of the plurality of pixel locations within a defined window about the particular pixel location, a difference between the input value associated with the particular location and the input value associated with the pixel locations within the defined window determining, for each of the plurality of pixel locations within the defined window, a filter weight based on the difference between the input value associated with the particular pixel location and the input value associated with the pixel location within the defined window includes the filter weight based on a first difference greater than the filter weight based on a second difference where the first difference is less than the second difference, determining, for each of the filter weights, a modified filter weight based on the filter weight and a preset window weight, and determining the filtered value based on the differences and the modified filter weights;

generating one or more edge weights related to at least one edge of the input image;

generating an output image based on the input image, the filtered image, and at least one of the edge weights; and outputting the output image.

27. The non-transitory computer-readable storage medium of claim 26, wherein:

receiving the input image comprises receiving a plurality of input values respectively associated with a plurality of pixel locations;

generating one or more edge weights comprises determining, for each of the plurality of pixel locations, a edge weight;

generating the output image comprises determining, for each of the plurality of pixel locations, an output value based on the input value associated with the pixel location, the filtered value determined for the pixel location, and the edge weight determined for the pixel location; and outputting the output image comprises outputting the plurality of output values determined for each of the plurality of pixel locations respectively associated with the plurality of pixel locations.

\* \* \* \* \*